R. E. DUPUY.
QUICK ACTING WRENCH.
APPLICATION FILED MAR. 27, 1919. RENEWED JAN. 26, 1921.
1,371,080.
Patented Mar. 8, 1921.
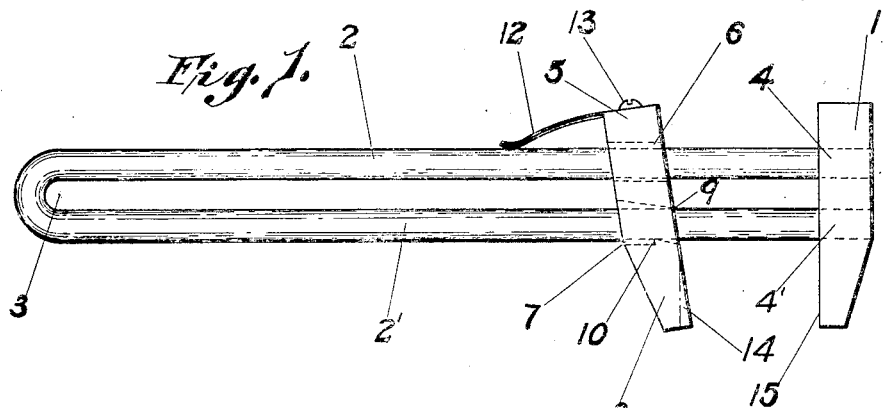
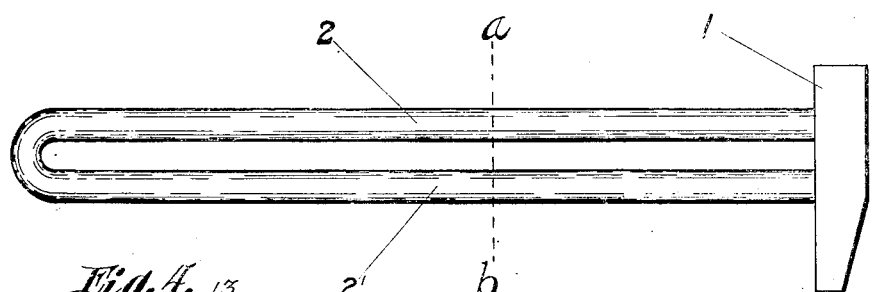
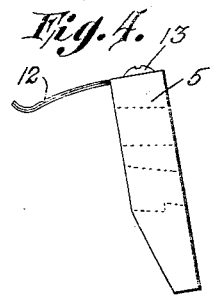
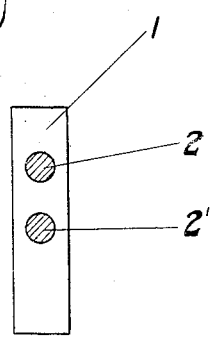
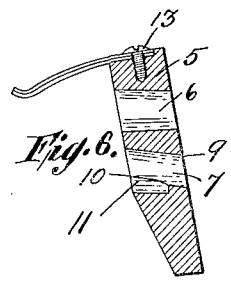
Inventor.
R. E. Dupuy.
by Adam E. Fisher
Attorney

UNITED STATES PATENT OFFICE.

ROBERT E. DUPUY, OF SUMMER LAKE, OREGON.

QUICK-ACTING WRENCH.

1,371,080.      Specification of Letters Patent.      Patented Mar. 8, 1921.

Application filed March 27, 1919, Serial No. 285,476. Renewed January 26, 1921. Serial No. 440,160.

*To all whom it may concern:*

Be it known that I, ROBERT E. DUPUY, a citizen of the United States, residing in the city of Summer Lake and State of Oregon, have invented new and useful Improvements in Quick-Acting Wrenches, of which the following is a specification, reference being had to the accompanying drawings.

This invention pertains to quick acting wrenches, and has for its object the production of a simple, practical and efficient wrench of this character, constructed of very few parts, and which may be quickly and effectively manipulated in practice.

Carrying out these purposes, attention is called to the accompanying drawings, wherein—

Figure 1 shows a wrench with the parts complete and properly assembled;

Fig. 2, a side elevation of the front jaw and rigidly mounted handle;

Fig. 3, a cross sectional view taken on the line $a$—$b$ in Fig. 2;

Fig. 4, a side elevation of the movable rear jaw with tension spring attached at the upper portion;

Fig. 5, a rear elevation of the movable rear jaw shown in Fig. 4;

Fig. 6, a vertical longitudinal section of the rear jaw taken on the line $c$—$d$ in Fig. 5.

Referring more particularly to the drawings, my invention consists of a front jaw 1 and double bar handle 2—2′ rigidly mounted to said front jaw 1, the bars of said handle being spaced apart as shown for a purpose which will be hereinafter described. This double bar handle is constructed preferably of round rod iron, although there is no reason why square bars could not be used. As shown, this double bar handle is constructed of a single piece of bar iron doubled back upon itself from the central point 3, and with the ends 4—4′ entering the fixed frontal jaw 1 and rigidly mounted therein. This forms a very simple and strong wrench.

Slidingly mounted upon the double bar handle 2—2′ is the movable rear jaw 5. This movable rear jaw 5 is pierced with two handle guide holes 6 and 7 spaced apart to accommodate the rods of the double bar handle 2—2′. The guide hole 6 serves for that purpose alone, and accommodates the upper bar 2 of the double bar handle, but the guide hole 7 acts both as a guide, as stated, and is so formed as to act as a lock upon the lower bar 2′ of the double bar handle 2—2′. To effect this locking effect in the guide hole 7, said hole pierces the jaw at an inclination, so as to normally throw the lower end 8 of the rear movable jaw 5 forwardly toward the fixed frontal jaw 1. So constructed and mounted upon the double bar handle 2—2′, the effect of the backward strain upon the rear movable jaw 5, when in use, is to cause the edge 9 and the edge 10 of the guide hole 7 to bite into and lock upon the lower bar 2′ of the double bar handle 2—2′. To accentuate this biting and locking effect, a portion of the rear movable jaw 5 may be cut away from the rear side thereof immediately below the lower bar 2′ of the double bar handle 2—2′, leaving the funnel-shaped recess 11 at said point, the effect of which is to bring the locking edge 10 forward closer to the locking edge 9, thereby increasing the tension and locking effect of said jaw against said lower bar. To offset the oblique effect upon the inner face of the rear movable jaw 5 given by the inclined guide-hole 7, the inner face of the lower end of said rear movable jaw may be squared off, as shown at 14, so as to extend parallel to the inner face 15 of the fixed frontal jaw 1. A tension spring 12 is rigidly mounted upon the upper end of the rear movable jaw 5 by means of a set screw 13, said tension spring extending rearwardly and having a sliding frictional bearing upon the upper rod 2 of the double bar handle 2—2′. The guide holes 6 and 7 are sufficiently large to enable the movable rear jaw 5 to readily slide back and forth upon the double bar handle 2—2′ when the lower end of said rear movable jaw is thrown forward, so as to release the locking edges 9 and 10, whereas, the normal effect of said tension spring 12 is to tend to throw said locking edges 9 and 10 against the lower bar 2′ of said double bar handle 2—2′, and so to lock the said rear movable jaw against idle motion.

In operation, the wrench may be very quickly adjusted to position upon a nut by merely pressing the lower end of the rear movable jaw 5 forwardly and the upper end thereof backwardly, thus releasing the locking edges 9 and 10, and enabling the operator to slide the jaw 5 into the desired position. So positioned, the tension spring 12 throws the locking edges 9 and 10 against the lower bar 2′ of the double bar handle 2—2', and locks the rear movable jaw 5 in set position. The wrench may then be readily manipulated upon the work.

While I have herein described a certain specific manner and method of constructing the elements of my invention, it is understood that I may vary from the same in minor details, not departing from the spirit of my invention, so as best to construct a practical device for the purpose intended, as defined in the appended claim.

What I claim to be new and patentable is:

A quick acting wrench, comprising a handle consisting of two parallel bars, a fixed jaw rigidly secured to one end of the handle, a movable jaw slidably mounted on the handle, said movable jaw provided with an outer cylindrical transverse guide aperture to receive the outer bar of the handle and an inner transverse aperture to receive the other bar of the handle, said inner aperture being disposed at an inclination with the outer aperture and formed in the outer edge of the inner half-portion of its wall with a rearwardly tapered or flared recess or cut-away portion, leaving diagonally disposed co-acting locking edges at the inner edge of the outer portion of said inner transverse aperture and the inner edge of the recessed portion thereof, respectively, said locking edges adapted to engage opposite edges of the inner handle bar when the movable jaw is in normal forwardly inclined position and resilient means for holding the movable jaw in normal position and against casual displacement on the handle.

ROBERT E. DUPUY.

Witnesses:
GEO. E. BARTHOLOMEW,
ELSIE E. MOORMANN.